Dec. 3, 1968   P. KORTENHOVEN   3,413,843
TRANSDUCER FOR ULTRASONIC TESTING OF PIPE
Filed Oct. 6, 1965   2 Sheets-Sheet 1
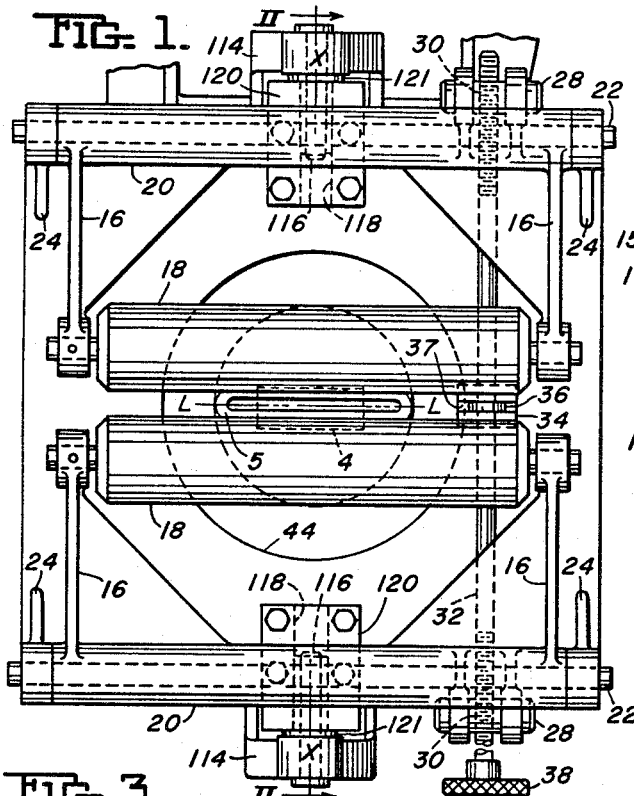
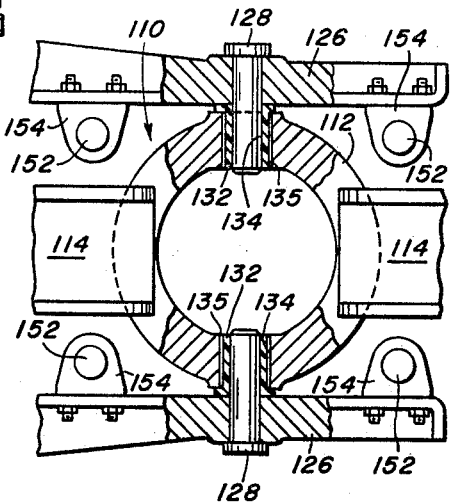
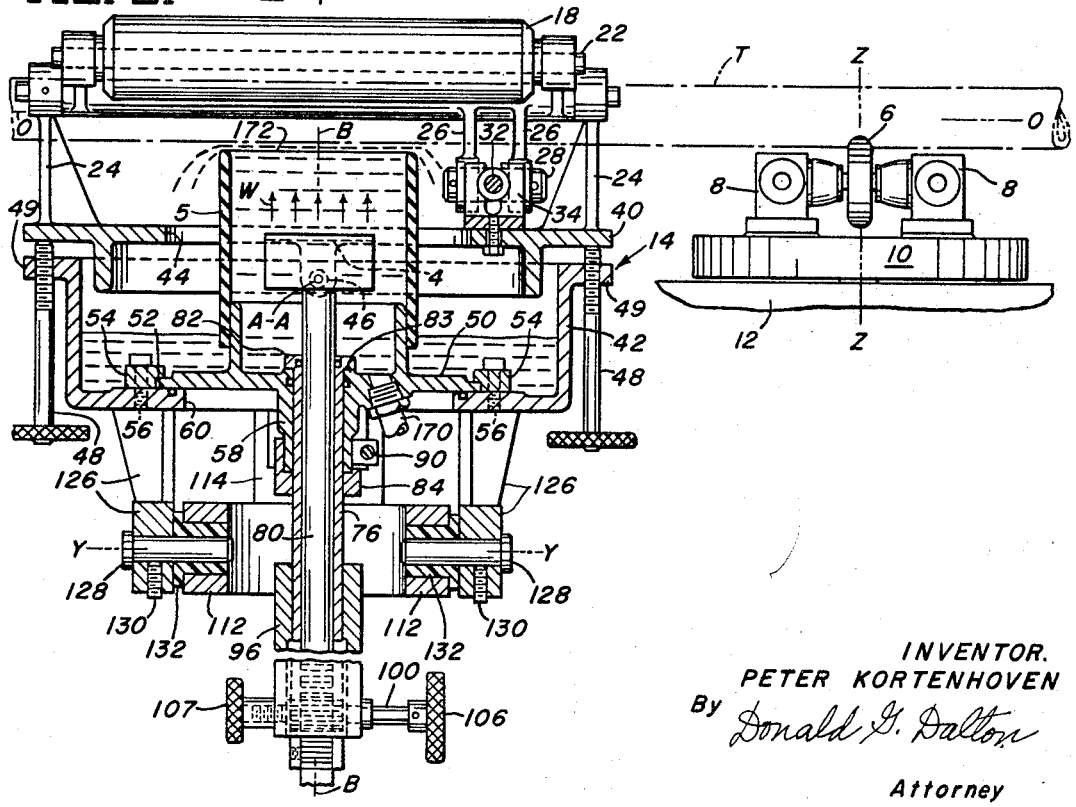
INVENTOR.
PETER KORTENHOVEN
By Donald G. Dalton
Attorney

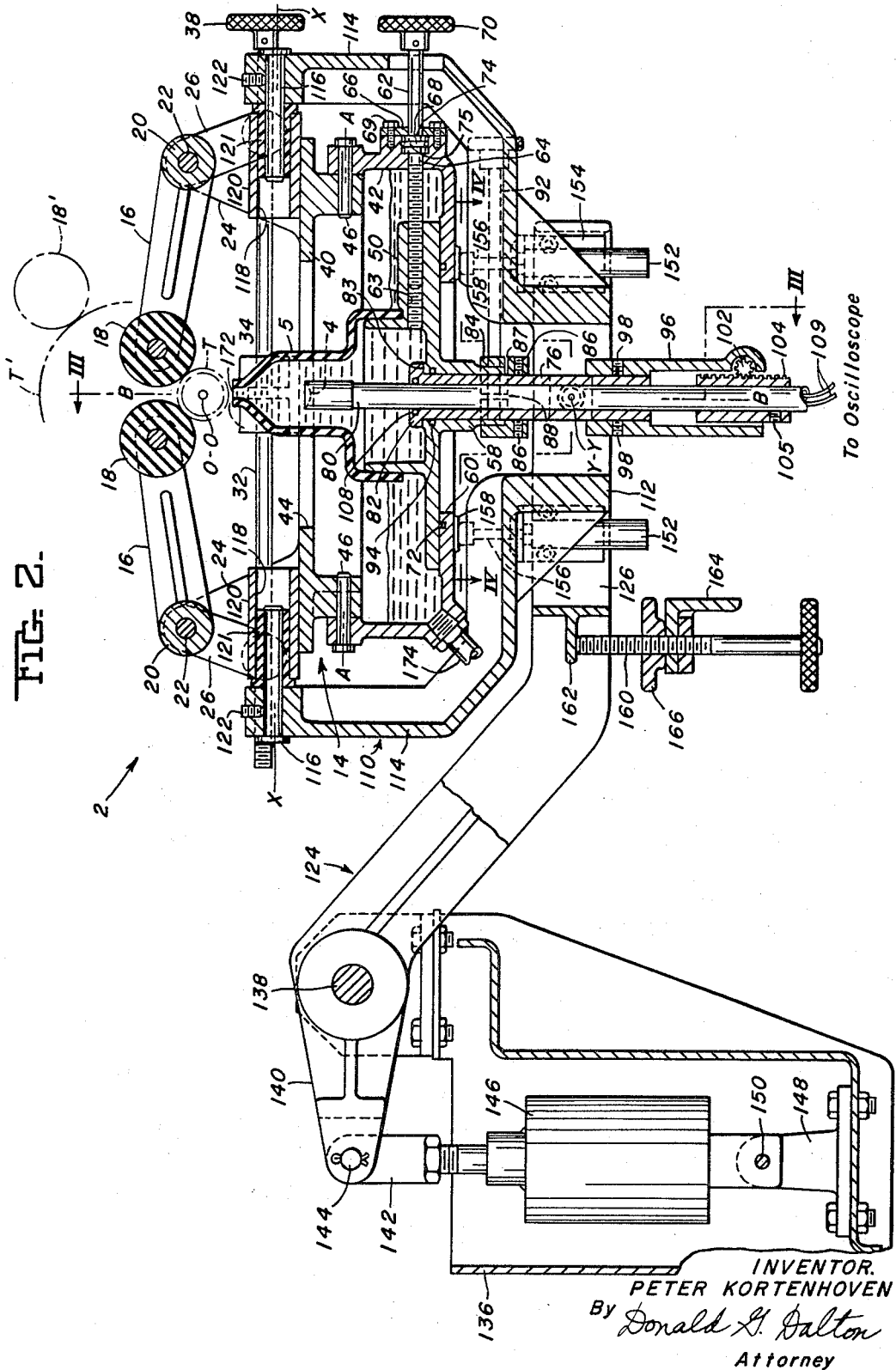

United States Patent Office 3,413,843
Patented Dec. 3, 1968

3,413,843
TRANSDUCER FOR ULTRASONIC TESTING OF PIPE
Peter Kortenhoven, Chicago, Ill., assignor to United States Steel Corporation, a corporation of Delaware
Filed Oct. 6, 1965, Ser. No. 493,413
9 Claims. (Cl. 73—71.5)

ABSTRACT OF THE DISCLOSURE

Apparatus for inspecting elongated articles for defects. The apparatus includes a stationary base, a pivotally supported carriage support, a gimbal mounted on the carriage support and pivoted about a horizontal axis, a carriage mounted on the gimbal and pivoted about a second horizontal axis, an ultrasonic crystal mounted on the carriage, and means for supporting the carriage on the article. In the preferred embodiment, a rubber boot surrounds the ultrasonic crystal, and means are provided for introducing liquid into the boot to form a liquid bridge between the ultrasonic crystal and the article. Various means are provided for adjusting the crystal on the carriage to its proper position relative to the surface of the article to be inspected.

---

This invention relates to apparatus used in the nondestructive testing of metal products for small internal cracks and other types of discontinuities. The particular apparatus disclosed is designed to support an ultrasonic crystal for detecting such defects in round metal bars and tubing. In general, the improvements to be shown and described relate to solving the difficult problem of maintaining correct orientation of an ultrasonic crystal relative to bar stock or tubing that is oscillating rapidly during its inspection.

The use of an ultrasonic crystal for detecting discontinuities in metal products is a common method of nondestructive testing. The crystal is made of a material such as quartz, which produces ultrasonic vibrations in reaction to having voltage of appropriate frequency impressed upon it. When inspecting a product for internal flaws, the crystal is held at an angle to the surface of the product so that the vibrations it produces enter the surface of the product at an angle and are reflected back to the crystal only when the waves hit a discontinuity within the product. This defect causes the waves to be reflected back to the crystal by the same path by which they travelled to the defect. The crystal is de-energized immediately following the emission of the wave, and when the ultrasonic waves are reflected back to the crystal, they set the crystal in vibration again, this time generating an electrical voltage instead of reacting to an impressed voltage, as described above. The operator usually watches for this electric voltage on an oscilloscope. In order to obtain an accurate reading of the oscilloscope to determine the existence of defects in the product, it is important that the vibrating crystal be held in a constant angular position with respect to the surface of the product.

Various electrical circuits have been designed for use in the inspection of products with ultrasonic waves. For example, some of these circuits are shown in U.S. Patent No. 3,019,636 issued to E. A. Henry on Feb. 6, 1962; U.S. Patent No. 3,050,989 issued to E. A. Henry on Aug. 28, 1962; U.S. Patent No. 3,057,189 issued to I. L. Joy on Oct. 9, 1962; and U.S. Patent No. 3,086,195, issued to W. Halliday on Apr. 16, 1963.

The high frequency of ultrasonic waves used for inspection of products cannot be transmitted through air, and a fluid coupling such as water or oil must be used between the crystal and the product. This fluid coupling may be accomplished by completely submerging both the inspection apparatus and the product in the fluid. However, more recently, a number of different type of ultrasonic inspection apparatus have been designed which do not require both the product and the apparatus to be submerged in the coupling fluid. Instead, a small chamber filled with the fluid is located next to the product, and the chamber has an opening very close to the product surface, such that the fluid in the chamber will flow against the surface. The crystal is mounted on the end of a probe that is inserted inside this chamber filled with fluid, and thus the fluid bridges the path between the crystal and the product. Examples of such apparatus are shown in U.S. Patent No. 2,592,134 issued to F. A. Firestone on Apr. 8, 1952; U.S. Patent No. 2,888,581 issued to J. P. Pahud on May 26, 1959; and U.S. Patent No. 3,109,112 issued to L. Beaujard on June 22, 1965.

The inspection apparatus shown in the foregoing patents is primarily designed for inspecting flat sheets and plates, and do not disclose how to cope with the problem of inspecting a product such as a long tube or bar, which due to slight bends oscillates laterally and up and down from its longitudinal axis while being inspected. These oscillations usually occur during inspections in which the bar, tube, or similar product is being rotated about this longitudinal axis. In order to inspect by ultrasonic means such oscillating products, so that accurate and meaningful results appear on the oscilloscope, the crystal and the container filled with coupling fluid must be moved with these oscillations, so that the crystal is maintained at the same distance and angle with respect to the surface of the product, and the orifice of the fluid container adjacent the product is also kept at a constant distance from the product surface. This requires a mounting apparatus for the crystal that will accurately follow the rapid oscillations of the product under inspection.

Difficulty has been experienced in the use of prior existing apparatus for holding inspection devices adjacent tubes, bars, and other products which oscillate rapidly in all directions during the inspection. Many of them are unable to follow properly the oscillations of bars or tubes in all directions of deviation from their longitudinal axes, because these apparatus have pivotal axes of rotation for the crystal that are not in the most desirable location or orientation with respect to the axis of the product. Some of this apparatus is in fact designed only for the special purpose of inspecting the joints of welded tubing as the weld is formed, a process during which the tube is fed longitudinaly between fixed supports without being rotated. Thus, the tube does not oscillate rapidly in all directions from its longitudinal axis, as it does when being rotated for the inspection of internal defects throughout the circumference of its wall. Examples of apparatus for inspecting the welded joints of tubing are shown in U.S. Patent No. 3,056,285 issued to W. J. Gibson et al., on Oct. 2, 1962, and in U.S. Patent No. 3,182,490, issued to W. J. Gibson on May 11, 1965.

Another cause of difficulty in following the oscillations of products with some types of apparatus is the tendency of the apparatus to bear against the product to such a degree as to throw the product off of its normal, longitudinal path of travel. This problem exists primarily with apparatus where the crystal is coupled with the product by fluid that is confined in a container and flows out through an orifice adjacent the product. In order to prevent a too rapid flow of water through this orifice, the container and the crystal inside the container are usually supported beneath the product so that the fluid must flow upwardly to escape from the orifice, and guide members on the apparatus adjacent the container are pushed upwardly upon the product to maintain the crystal and container moving with the product. However, instead of moving with the product, the apparatus frequently moves the product up off its roller supports. When this happens, the product may either completely leave contact with the inspection apparatus, or the oscillations of the product become so great that the apparatus could not possibly keep up with them.

Another problem exists in the construction of the means for adjusting the position of the crystal with respect to the product under inspection. Many different types of crystal adjustments are required, such as movement of the crystal about various axes of rotation and movement toward or away from the product and laterally to either side of the product. All of these adjustments must be capable of being made accurately in order to obtain signals on the oscilloscope that can be interpreted to show where defects occur in the product. In order to make these accurate adjustments, it is most desirable that each of the various types of adjustment means operate independently of the others, so that the making of one adjustment will not alter others which have been made. At the same time, each of the knobs or screws with which an adjustment is made, should be easily accessible to the operator, for the sake of both accuracy and ease of operation.

It is one object of my invention to provide an improved apparatus for supporting an ultrasonic crystal adjacent a product being inspected which will overcome the problems described above, and will follow the oscillations of products under inspection with improved accuracy.

Another object of my invention is to provide apparatus for supporting an ultrasonic crystal adjacent a product having improved means for adjusting the position of the crystal relative to the product under inspection.

These and other objects will appear more readily from the following detailed description of my invention and the attached drawings in which:

FIGURE 1 is a top view of a portion of an inspection apparatus embodying my invention;

FIGURE 2 is a sectional view of the apparatus of FIGURE 1 taken along line II—II of FIGURE 1 and showing also a side view of the remainder of said apparatus not shown in FIGURE 1;

FIGURE 3 is a sectional view of the apparatus of FIGURE 2, taken along line III—III of FIGURE 2; and FIGURE 4 is a sectional view of the apparatus of FIGURE 2, taken along line IV—IV of FIGURE 2.

Referring to FIGURE 2, apparatus 2 is shown holding a centrally located quartz crystal 4 beneath a tube T, shown in chain lines. The crystal 4 is surrounded by a rubber boot or container 5 that is filled with water. The tube T is supported along its length on pairs of rubber wheels such as wheels 6 on either side of the tube (FIGURE 3). Electric motors 8 drive the wheels 6 and are mounted on a turret base 10, which is rotatable about an axis Z—Z. The turret base 10 is rotated about axis Z—Z to place the wheels 6 at an acute angle to the tube T so that the wheels, driven by motors 8, will both rotate the tube T about its lengthwise axis O—O and at the same time feed it forward to the left, as viewed in FIGURE 3. The turret base 10 is rotatably mounted on a member 12 of an appropriate table frame, the remainder of which is not shown in the drawings.

The crystal 4 is mounted on a carriage 14 which is suspended beneath the tube T by means of two pairs of arms 16 (FIGURES 1 and 2). Rollers 18 are rotatably mounted on ends of the arms 16 and ride on top of the tube T. At their opposite ends, the two arms 16 on each side of the tube (FIGURE 1) are connected together by a sleeve 20 which is rotatably mounted on a long pin 22. Each pin 22 is in turn supported rotatably at either end by brackets 24 extending upwardly from the carriage 14. As shown most clearly in FIGURE 3, each sleeve 20 has a pair of short arms 26 which hold a rotatable pin 28. A tapped hole 30 (FIGURE 1) extends through the diameter of each pin 28 and engages the threads of a long adjusting screw 32 (FIGURE 1). Screw 32 is rotatably supported at its center in a split bearing block 34 that is mounted on the carriage 14 (FIGURE 1). A flange 36 is fixed to the screw and is housed within slot 37 of the block 34, thus keeping the screw from moving axially. One end of the screw 32 has right-hand threads and the other end has left-hand threads, so that when knob 38 on the screw is turned, pins 28 will be drawn toward or away from each other, thus rotating the sleeves 20 in opposite directions to adjust the positions of the arms 16. The positions of the arms 16 and rollers 18 riding on top of the tube T are determined by the diameter of the tube. The rollers 18 shown in solid lines in FIGURE 2 are adjusted for tracking a tube T of small diameter, while roller 18' in chain lines (FIGURE 2) is positioned for tracking a tube T' of large diameter. When positioning the apparatus on the tube, the screw 32 is turned to rotate the arms 16 toward each other until the top of the rubber boot 5 and carriage 14 is raised to within a very short distance of the tube T (FIGURE 2). Preferably, the top of the boot 5 is spaced about a quarter of an inch from the tube.

The carriage 14 is equipped with a number of means for adjusting the position of the crystal 4 relative to the tube T. One adjustment which must be made is rotation of the crystal 4 about a horizontal axis A—A (FIGURE 2) perpendicular to the axis of the tube, so that the ultrasonic waves emitted along the length of the crystal will travel to the tube along paths perpendicular to the axis of the tube, as shown by arrows W in FIGURE 3. For this purpose, the carriage is divided into two parts, namely an upper carriage half 40 carrying the brackets 24 for supporting the carriage on the tube T, and a lower carriage half 42 on which are mounted the crystal 4 and surrounding boot 5. The upper carriage half 40 has a wide circular opening 44 through which passes the boot 5. The upper and lower carriage halves are pivotally connected together by pins 46 aligned with axis A—A (FIGURE 2). Adjusting screws 48, shown in FIGURE 3, threadably engage holes in flanges 49 on the lower carriage half 42. Flanges 49 are disposed on a line that is perpendicular to the axis A—A through pins 46. The screws 48 are turned until they contact the bottom of the upper carriage half 40. By lowering one screw 48 and raising the other, the angular position of the carriage halves 40 and 42 with respect to each other may be changed to adjust the orientation about the axis A—A of crystal 4 with respect to the tube T.

Also, the crystal 4 must be capable of being offset a proper distance to the right or left of the axis O—O of tube T, as viewed in FIGURE 2, so that the ultrasonic waves will enter the tube at an upwardly curving place on the tube surface. If the crystal were focused on the lowest place on the tube surface, the waves would strike at right angles to the tube surface and would not be reflected into the internal structure of the tube. Instead, all of the waves would be reflected back to the crystal. In order to move the crystal 4 laterally of the tube T so as to adjust the ultrasonic waves to the desired angle of incidence on the tube surface, a slide member 50 (FIGURES 2 and 3) is supported on the bottom carriage half 42 and holds both the rubber boot 5 and the crystal 4. Slide member 50 travels on a machined surface 52 of the carriage half 42 and is constrained to move along a path perpendicular to the axis O—O of the tube T by gibs 54, shown in FIGURE 3, which are secured to the carriage half 42 by bolts 56. The slide member 50 has a tubular extension 58 below the bottom of the carriage half 42, which passes through a large opening 60 in the member 42.

A screw 62 (FIGURE 2) threadably engages a tapped hole 63 in the slide member 50 and extends through a hole 64 in carriage half 42. The screw is held rotatably within the hole 64 but is held from axial movement by a plate 66 bearing against flange 68 on the screw. The plate 66 is secured to the carriage half 42 by bolts 69. The screw 62 is rotated by turning knob 70, thereby adjusting the lateral position of the slide member 50 supported crystal 4 and boot 5.

The carriage half 42 is designed to hold water, and to prevent water leakage through the opening 60 in member 42, an O-ring 72 is placed between the slide member 50 and carriage half 42 adjacent the opening 60. Also an O-ring 74 is placed in a slot 75 in the flange 68 of screw 62, to prevent water leakage through hole 64.

As shown in FIGURE 1, the crystal 4 is long compared to its width, and it must be held so that the ultrasonic waves emitted from all parts of the crystal along its length enter the tube at the same angle to the tube surface. This requires that the crystal be capable of being rotated about a vertical axis B—B (FIGURE 2) until its longitudinal center line L—L (FIGURE 1) is in a vertical plane parallel with the longitudinal axis of the tube. In order to enable the crystal to be rotated about the axis B—B, a sleeve 76 is rotatably held within tubular extension 58 of slide member 50. Inside the sleeve 76 is contained a probe 80 on top of which is mounted the crystal 4. The sleeve 76 is held from vertical movement by its top flange 82 bearing against the surface of a circular boss 83 on slide member 50. A split ring 84 surrounds the sleeve 76 and is secured to the sleeve by screws 86 in the lower half of the ring. The upper half of the ring 84 is placed over the end of the tubular extension 58 of slide member 50. The right half of the ring 84, as viewed in FIGURE 2, has a horizontal slot 87 separating the upper and lower parts of the ring, and through one side of the upper part of ring 84 extends a vertical slot 88. A screw 92 threadably engages horizontal holes in ring 84 on either side of slot 88, and this screw is used to tighten and untighten the upper half of the ring 84 against the boss 58. When the ring is not tightened on the boss 58, the sleeve 76 and probe 80 holding the crystal 4 may be turned about vertical axis B—B (FIGURE 2) to bring the longitudinal center lines L—L (FIGURE 1) of the crystal into a vertical plane parallel to axis O—O of tube T. An O-ring 94 fits between the sleeve 76 and the slide member 50 to prevent the water in rubber boot 5 from leaking out through the hole in the tubular extension 58 of slide member 50.

Finally, the crystal must be capable of adjustment toward and away from the tube T in order to properly focus the waves emitted from the crystal 4 on the surface of the tube. A sleeve 96 of wider diameter than sleeve 76 is mounted on the lower end of sleeve 76 by means of screws 98. As shown in FIGURE 3, the sleeve 96 holds a rotatable shaft 100. A pinion 102, best seen in FIGURE 2, is mounted on the shaft 100 and meshes with a rack 104 (FIGURE 2). Set screw 105 secures the rack 104 to the probe 80. The probe 80 is slidable within sleeve 76, and by turning knob 106 (FIGURE 3) on the shaft 100, the probe 80 may be moved up or down within the sleeve 76. The crystal 4 on top of probe 80 may thus be adjusted to focus the ultrasonic waves on the surface of the tube T. Knob 107 is threadably connected to the left end of shaft 100 (FIGURE 3), and this knob may be tightened against sleeve 96 to prevent the shaft 100 from rotating and thus lock the probe 80 in position after the crystal 4 has been focused. An O-ring 108 between the probe 80 and sleeve 76 prevents water in the boot 5 from escaping through this area.

The probe 80 is hollow and has wires 109 (FIGURE 2) which extend through its center and are connected to the crystal 4 on top of the probe. At their other ends, the wires 108 are connected to current generating means and also to an oscilloscope on which are read the reflections from defects in the tube T.

In addition to being supported on the tube T by arms 16 and rollers 18, the carriage 14 is also held rotatably about an axis X—X by a gimbal member 110 (FIGURE 2). The gimbal member 110 includes a ring 112 (FIGURE 4) and arms 114 extending upwardly from the ring 112 and around opposite sides of the carriage 14 (FIGURE 2). At the tops of these arms are secured pins 116 which rotatably support the carriage 14 about the axis X—X (FIGURE 2). The pins 116 are inserted through holes 118 of blocks 120, which are in turn mounted on top of the upper carriage plate 40. The holes 118 are equipped with bushings 121, and set screws 122 hold the pins 116 fixed to the gimbal member 110 while the carriage 14 rotates.

The carriage 14 is thus capable of pivoting about axis X—X so that the crystal 4 supported on the carriage may follow the variations up and down of the slope of the tube T as it is fed forward during its inspection. The axis X—X is located vertically close to the tube T so that the carriage 14 may tilt easily to conform to changes in the upward and downward slope of the tube T.

Gimbal ring 112 is rotatably supported on a lever 124 (FIGURE 2). Legs 126 of the 124 extend on either side of the gimbal ring 112 (FIGURE 4), and the ring 112 is connected between these legs by pins 128. Set screws 130 (FIGURE 3) secure the pins 128 to the legs 126, and the pins 128 rotate within the bushings 132. The bushings 132 are square, and as shown in FIGURE 4, they fit in rectangular holes 134 in gimbal ring 112, leaving spaces 135 on either side of each bushing for lateral movement of the gimbal member 110 with respect to the legs 126 of lever 124. These slidable bushings 132 thus aid the carriage 14 in tracking the lateral oscillations of the tube T.

The gimbal member 110 and connected carriage 14 thus pivot about an axis Y—Y through pins 128 (FIGURES 2 and 3), so that the crystal 4 on the carriage 14 may follow the lateral oscillations of the tube T. The axis Y—Y is located at a substantial vertical distance from the tube T, compared to the distance of axis X—X, so that the carriage need tilt at only a small angle to follow large lateral movements of the tube T.

In addition to being located at a great distance from the tube T, the rotational axis Y—Y is also positioned beneath the center of gravity of the carriage 14. This factor also enables the carriage to track better the oscillations of the tube, since the center of gravity of the carriage 14 moves slightly downward with respect to the axis Y—Y as the tube T moves to the right or left of its longitudinal axis O—O (FIGURE 2). There will be a tendency to offset this downward movement, since the axis Y—Y will have to be raised slightly during this lateral movement, in order that the distance between the axis O—O of tube T and axis Y—Y of the carriage 14 remain the same (FIGURE 2). Thus, little or no lifting movement of the carriage 14 will be required to follow the lateral oscillations of the tube T either toward or away from its axis O—O. By contrast, if the axis Y—Y were located above the center of gravity of the carriage 14, the lateral movement of the tube T to the right or left of axis O—O would require the lifting of the carriage 14 with repsect to axis Y—Y as well as the raising of axis Y—Y, and these two motions combined would result in a considerable lifting of the carriage 14 and make it difficult for the carriage 14 to follow the lateral movements of the tube T. The rollers 18 which guide the carriage 14 might even fall off the tube T if the weight of the carriage were great enough.

As shown in FIGURE 2, the lever 124 is pivotally connected to a base member 136 by a pin 138. A rearward extending arm 140 on the lever 124 is pivotally connected to a piston rod 142 by a pin 144. The rod 142 is connected to a piston sliding within the air cylinder 146, which is connected to bracket 148 on base 136 by a pin 150. As the tube T oscillates up and down, the carriage 14 and gimbal member 110 are permitted to follow these movements because they are mounted on the lever 124, which can move up and down pivoting about pin 138. The air pressure in cylinder 146 dampens these up and down movements so that the apparatus 2 will ride smoothly on the tube T and sudden oscillations of the tube will not cause the rollers 18 to be thrown upward to such an extent that they will leave contact with the tube.

The rotational movements of the carriage 14 about axes X—X and Y—Y are also dampened to improve the tracking ability of the apparatus. Four air cylinders 152 are mounted on the inner sides of legs 126 of lever 124. All four of these cylinders are shown from the top in FIGURE 4 and two of the cylinders are shown in elevation in FIGURE 2. Bracket supports 154 bolted to the sides of the legs 126 support the cylinders 152. Each cylinder has a piston rod 156 that is forced upwardly by the pressure in the cylinder 152 into contact with a boss 158 on the carriage 14. The pressure in the cylinders 152 may be adjusted to obtain the desire dampening of the carriage 14 as it rotates about the axes X—X and Y—Y.

The lever 124 is limited in its lower travel by the top of a screw 160 contacting a cross member 162 on the lever 124. The screw 160 is mounted on a support member 164 of the table frame (not shown) which carries the wheels 6 on which the tube T is supported. The screw 160 threadably engages a hole in a support member 164 and may be turned within this hole to adjust the height at which it stops the downward travel of the lever 124. A knob 166 threaded on to screw 160 is tightened against the member 164 to lock the screw 160 in its desired position.

In order to provide a coupling fluid between the crystal 4 and the surface of the tube T, water is introduced into the rubber boot 5 through an inlet tube 170 (FIGURE 3). During the operation of the inspecting apparatus 2, the boot 5 is kept full of water so that the water overflows through opening 172 in the top of boot 5 and into contact with the tube T. The pressure in the tube 170 is at a level sufficient to replenish the water flowing out through opening 172 and to maintain a column of water between the crystal 4 and the tube T. After the water dribbles out of the opening of the boot 5, it is collected in the bottom of the lower carriage member 42, from where it is drawn off through the outlet tube 174 (FIGURE 2).

In operation, the front end of the tube T is fed forward by rollers 6 (FIGURE 3) until it is adjacent the apparatus 2.

Rollers 18 of the apparatus are then positioned on top of the tube T by means of adjusting screw 32, which is turned until the opening 172 in the top of rubber boot 5 is raised to approximately one-quarter inch from the bottom of the tube T.

The crystal 4 is connected to an oscilloscope and appropriate electrical circuitry. The water in inlet tube 170 is turned on to fill the rubber boot 5, and sufficient water pressure is maintained to keep the water bubbling out of the opening 172 and into contact with the surface of tube T.

Then, by a number of independent adjustments, the crystal 4 is set in its proper position relative to the tube T. First, screws 48 (FIGURE 3) are turned to rotate the crystal about axis A—A (FIGURE 2) until the connected oscilloscope indicates the ultrasonic waves W (FIGURE 3) are perpendicular to the axis of the tube T. Then, knob 70 on screw 62 (FIGURE 2) is turned to move the slide member 50 and crystal 4 laterally of the tube T, until the oscilloscope shows that the ultrasonic waves are entering the tube T at the proper angle to the tube surface. Following that adjustment, the screw 92 (FIGURE 2) is turned to untighten the ring 84 from the tubular extension 58 of the slide member 50. Then, using screw 92 as a lever, the sleeve 76 and probe 80 inside the sleeve are rotated to turn the crystal 4 about axis B—B until the longitudinal center line L—L of the crystal 4 is brought into a vertical plane parallel with the axis O—O of the tube T. Finally, the ultrasonic waves from the crystal 4 are focused on the tube T by adjusting the height of probe 80 with knob 106.

The screw 160 is checked to insure a proper lower limit for the lever 124, and the air pressures in cylinders 146 and 152 are adjusted to give the proper dampening to the motions of carriage 14 as it follows the oscillations of the tube T.

Each turret base 10 holding a pair of wheels 6 (FIGURE 3) is turned about its axis Z—Z to an angle such that the wheels 6 will cause the tube T to advance past the crystal 4 at a proper rate. This rate of advancement should be such that all parts of the tube surface will at some time face the crystal 4. For instance, if a crystal 2 inches long is used, a rate of advancement of 1¼ inches per revolution would be recommended.

After the crystal has been set with the improved accuracy obtainable by the above-described adjustment means, motors 8 driving the wheels 6 are turned on and the tube T is rotated and fed past the ultrasonic inspection crystal 4. While the tube T oscillates from its longitudinal axis of travel O—O, the improved means for supporting the crystal 4 adjacent the tube enables the crystal to follow oscillations of the tube and to maintain its accurately set position with respect to the tube.

While one embodiment of my invention has been shown and described, it will be apparent that adaptations and modifications may be made without departing from the scope of the appended claims.

I claim:

1. Apparatus for inspecting an elongated article which travels in the direction of its longitudinal axis and is subjected to oscillating radial movements, said apparatus comprising a stationary base, a carriage support movably mounted on said base so as to travel toward and away from the article, a gimbal pivoted to said carriage support beneath the article for movement about a horizontal axis, a carriage beneath said article pivoted to said gimbal for movement about a horizontal axis at right angles to said first named horizontal axis, means mounted on said carriage for introducing ultrasonic waves into the article, guide means connected to said carriage for containing the article so as to follow the oscillating movement thereof, one of said pivotal axes being perpendicular to the longitudinal axis of the product and close to said axis of the product whereby said carriage pivots easily to conform to changes in the upward and downward slope of said article, and the other pivotal axis being relatively distant from said axis of the article whereby said carriage pivots at small angles in following relatively large lateral oscillations of said article.

2. Apparatus of claim 1 wherein said other pivotal axis is also beneath the center of gravity of said carriage.

3. Apparatus of claim 1 including a slide member mounted on said carriage and slidable laterally with respect to the longitudinal axis of said product.

4. Apparatus of claim 1 including means fixed between said carriage support and said base member for dampening the motion of said carriage support member, and means fixed between said carriage support and said carriage for dampening the motions of said carriage about said pivotal axes.

5. Apparatus for inspecting an elongated article which travels in the direction of its longitudinal axis and is subjected to oscillating radial movements, said apparatus comprising a stationary base, a carriage support movably mounted on said base so as to travel toward and away from the atricle, a gimbal pivoted to said carriage support beneath the article for movement about a horizontal axis, a carriage beneath said article pivoted to said gimbal for movement about a horizontal axis at right angles to said first named horizontal axis, one of said pivotal axes being perpendicular to the longitudinal axis of the product and close to said axis of the product whereby said carriage pivots easily to conform to changes in the upward and downward slope of said article, and the other pivotal axis being relatively distant from said axis of the article whereby said carriage pivots at small angles in following relatively large lateral oscillations of said article, a pair of arms connected to said carriage on either side of said product and resting on an upwardly facing surface of said product so as to move with the oscillating movements of the product, a crystal mounted on said carriage for introducing ultrasonic waves into said product, a container mounted on said carriage and surrounding said crystal and having an orifice in close proximity with said product, means for introducing a liquid into said container so as to maintain an uninterrupted column of liquid between said crystal and said product, means for drawing off liquid that has escaped from between said product and said orifice.

6. Apparatus of claim 5 wherein said arms are pivotally connected to said carriage and the apparatus includes means to adjust the angular position of said arms so as to be able to suspend said carriage from varying sizes of cylindrical products and adjust the spacing between the orifice of said container and said product.

7. Apparatus for inspecting an elongated article that is being subjected to oscillating radial movements toward and away from its longitudinal axis, said apparatus comprising a stationary base, a carriage support movably mounted on said base so as to travel toward and away from said product, a gimbal pivoted to said carriage support beneath the article for movement about a horizontal axis, a carriage beneath said article pivoted to said gimbal for movement about a horizontal axis at right angles to said first named horizontal axis, said carriage being divided into two carriage halves, said halves pivotally connected to one another on a substantaily horizontal axis perpendicular to said axis of the product, means mounted on the first of said carriage halves for introducing ultrasonic waves into said product, guide means connected to the second carriage half and supported on an upwardly facing surface of said product so as to follow the oscillating movements of the product, means for adjusting the angular position of said carriage halves with respect to each other.

8. Apparatus of claim 7 including a slide member for carrying said means for introducing ultrasonic waves into the product, said slide member being slidably mounted on said first carriage half, means for constraining said slide member to a path perpendicular to said axis of the product, and means for adjusting and fixing the position of said slide member on said path so as to position said inspection means laterally with respect to said product.

9. Apparatus of claim 7 including a cylindrical sleeve member for carrying said inspection means for the product, said sleeve member mounted on said first carriage half rotatably about an axis perpendicular to said axis of the product, a probe for supporting said means for introducing ultrasonic waves into said product, said probe mounted within said sleeve and slidable axially with respect thereto, means for adjusting the angular position of said sleeve with respect to said carriage so as to change the orientation of said inspection means with respect to the product, and means for axially adjusting said probe with respect to said sleeve to move said means for introducing ultrasonic waves toward or away from said product. product.

References Cited
UNITED STATES PATENTS

| | | | |
|---|---|---|---|
| 3,056,285 | 10/1962 | Gibson et al. | 73—67.8 |
| 3,182,490 | 5/1965 | Gibson et al. | 73—67.8 |
| 3,289,468 | 12/1966 | Van der Veer et al. | 73—71.5 |

RICHARD C. QUEISSER, *Primary Examiner.*

JOHN P. BEAUCHAMP, *Assistant Examiner.*

UNITED STATES PATENT OFFICE
CERTIFICATE OF CORRECTION

Patent No. 3,413,843　　　　　　　　　　　　December 3, 1968

Peter Kortenhoven

It is certified that error appears in the above identified patent and that said Letters Patent are hereby corrected as shown below:

Column 2, line 20, after "and" insert -- they --; line 49, "longitudinaly" should read -- longitudinally --. Column 5, line 38, "lines L-L" should read -- line L-L --. Column 6, line 18, before "124" insert -- lever --; line 56, "repsect" should read -- respect --. Column 7, line 15, "desire" should read -- desired --. Column 8, line 41, "containing" should read -- contacting --; line 42, "movement" should read -- movements --; line 67, "atricle" should read -- article --. Column 9, line 33, "substantailly" should read -- substantially --. Column 10, line 27, cancel "product.".

Signed and sealed this 10th day of March 1970.

(SEAL)
Attest:

Edward M. Fletcher, Jr.　　　　　　　　　　WILLIAM E. SCHUYLER, JR.

Attesting Officer　　　　　　　　　　　　　Commissioner of Patents